(12) United States Patent
Kuki et al.

(10) Patent No.: US 10,028,043 B2
(45) Date of Patent: Jul. 17, 2018

(54) WATERPROOF SOUND-PERMEABLE MEMBRANE, WATERPROOF SOUND-PERMEABLE MEMBER, AND ELECTRONIC DEVICE

(71) Applicant: NITTO DENKO CORPORATION, Osaka (JP)

(72) Inventors: Nobuharu Kuki, Osaka (JP); Tamao Fukushima, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 15/655,087

(22) Filed: Jul. 20, 2017

(65) Prior Publication Data
US 2017/0325011 A1  Nov. 9, 2017

Related U.S. Application Data

(63) Continuation of application No. PCT/JP2016/004939, filed on Nov. 21, 2016.

(30) Foreign Application Priority Data

Nov. 24, 2015 (JP) ................................. 2015-229047

(51) Int. Cl.
*H04R 1/02* (2006.01)
*H04R 1/44* (2006.01)

(52) U.S. Cl.
CPC ............... *H04R 1/023* (2013.01); *H04R 1/44* (2013.01); *H04R 2499/11* (2013.01)

(58) Field of Classification Search
CPC ..................................................... H04R 1/086
See application file for complete search history.

(56) References Cited

U.S. PATENT DOCUMENTS

| 5,828,012 A * | 10/1998 | Repolle ................ | G10K 11/18 181/175 |
| 6,512,834 B1 * | 1/2003 | Banter .................. | H04R 1/086 381/189 |

(Continued)

FOREIGN PATENT DOCUMENTS

| JP | 2007-81881 | 3/2007 |
| JP | 4751476 | 5/2011 |

(Continued)

OTHER PUBLICATIONS

International Search Report issued in International Patent Application No. PCT/JP2016/004939, dated Feb. 7, 2017, along with English-language translation.

*Primary Examiner* — Curtis Kuntz
*Assistant Examiner* — Ryan Robinson
(74) *Attorney, Agent, or Firm* — Greenblum & Bernstein, P.L.C.

(57) ABSTRACT

The waterproof sound-permeable membrane of the present disclosure is a waterproof sound-permeable membrane adapted to permit passage of sound and prevent ingress of water. The air permeability of the waterproof sound-permeable membrane, as expressed by Gurley number, is 20 seconds/100 mL or more. The water entry pressure of the waterproof sound-permeable membrane is 500 kPa or more. When a tensile strength at break of the waterproof sound-permeable membrane in a MD direction is denoted by T1 and a tensile strength at break of the waterproof sound-permeable membrane in a TD direction orthogonal to the MD direction is denoted by T2, a strength ratio (T1/T2) is in a range of 0.5 to 2.0.

20 Claims, 8 Drawing Sheets

(56) References Cited

U.S. PATENT DOCUMENTS

| | | | |
|---|---|---|---|
| 7,306,729 B2* | 12/2007 | Bacino | B01D 39/1692 |
| | | | 210/500.22 |
| 8,939,252 B2* | 1/2015 | Sanborn | H04R 1/023 |
| | | | 181/199 |
| 9,171,535 B2* | 10/2015 | Abe | G10K 11/002 |
| 9,578,402 B2* | 2/2017 | Mori | H04M 1/03 |
| 2009/0268928 A1 | 10/2009 | Ikeyama et al. | |
| 2011/0255728 A1 | 10/2011 | Abe et al. | |
| 2016/0301998 A1* | 10/2016 | Abe | H04R 1/086 |
| 2016/0337737 A1* | 11/2016 | Kato | H04R 1/023 |
| 2016/0376144 A1* | 12/2016 | Holliday | H04R 1/086 |
| | | | 257/416 |
| 2017/0006365 A1 | 1/2017 | Mori et al. | |
| 2017/0006369 A1* | 1/2017 | Kenaley | B32B 5/02 |

FOREIGN PATENT DOCUMENTS

| | | | | |
|---|---|---|---|---|
| JP | 2014-207590 | | 10/2014 | |
| JP | 2015111820 A | * | 6/2015 | H04R 1/086 |
| JP | 2015-160856 | | 9/2015 | |
| JP | 2015-205979 | | 11/2015 | |

* cited by examiner

WATERPROOF SOUND-PERMEABLE MEMBRANE, WATERPROOF SOUND-PERMEABLE MEMBER, AND ELECTRONIC DEVICE

This application is a Continuation of PCT/JP2016/004939 filed on Nov. 21, 2016, which claims foreign priority of Japanese Patent Application No. 2015-229047 filed on Nov. 24, 2015, the entire contents of which are incorporated herein by reference.

BACKGROUND OF THE INVENTION

1. Field of the Invention

The present invention relates to a waterproof sound-permeable membrane, a waterproof sound-permeable member, and an electronic device.

2. Description of Related Art

Electronic devices such as mobile phones, smartphones, laptop computers, electronic notebooks, digital cameras, and game consoles have an audio function. Inside the housing of an electronic device having an audio function, there is placed a sound transducer such as a speaker, buzzer, or microphone. The housing is provided with an opening for directing sound to the sound transducer from the outside of the housing and/or an opening for directing sound to the outside of the housing from the sound transducer. To prevent foreign matters such as water droplets from entering the housing, a waterproof sound-permeable membrane (which hereinafter may be simply referred to as a "sound-permeable membrane") is attached to the opening of the housing.

JP 2007-81881 A states that a porous membrane of polytetrafluoroethylene (PTFE) can be used as a sound-permeable membrane. JP 4751476 B2 states that a non-porous film made of a resin such as PTFE, polyester, polycarbonate, polyethylene, or polyimide can be used as a sound-permeable membrane.

SUMMARY OF THE INVENTION

In recent years, the waterproofness required of electronic devices is becoming higher and higher. Specifically, some electronic devices are required to have a level of waterproofness that is not only sufficient for daily use but also high enough to allow the electronic devices to be submerged in water or even allow the electronic devices to be used at a given water depth for a certain period of time. Improvements to sound-permeable membranes are indispensable to enhance the waterproofness of electronic devices. As for the properties of sound-permeable membranes, however, there is a trade-off relationship between their water resistance (waterproofness) and sound permeability. It is therefore considerably difficult to improve both the water resistance and sound permeability of sound-permeable membranes at the same time.

It is an object of the present invention to provide a new technique for improving the water resistance and sound permeability of waterproof sound-permeable membranes.

In the course of extensive investigations on the water resistance and sound permeability of sound-permeable membranes, the present inventors have found that there is the following technical problem. That is, sound-permeable membranes exposed to high water pressure for a certain period of time undergo a significant decrease in their sound permeability. It is important for sound-permeable membranes not only to have a high sound permeability before exposed to water pressure but also to maintain the sound permeability after exposed to water pressure. The present inventors have discovered that there is a correlation between the anisotropy of the strength of sound-permeable membranes and the decrease in their sound permeability caused by a water penetration test, and have completed the present invention on the basis of the discovery.

That is, the present disclosure provides a waterproof sound-permeable membrane adapted to permit passage of sound and prevent ingress of water, wherein an air permeability of the waterproof sound-permeable membrane, as expressed by Gurley number, is 20 seconds/100 mL or more, a water entry pressure of the waterproof sound-permeable membrane is 500 kPa or more, and when a tensile strength at break of the waterproof sound-permeable membrane in a MD direction is denoted by T1 and a tensile strength at break of the waterproof sound-permeable membrane in a TD direction orthogonal to the MD direction is denoted by T2, a strength ratio (T1/T2) is in a range of 0.5 to 2.0.

In another aspect, the present disclosure provides a waterproof sound-permeable member including:

the above waterproof sound-permeable membrane according to the present disclosure; and a bonding layer placed on a surface of the waterproof sound-permeable membrane.

In still another aspect, the present disclosure provides an electronic device including:

a sound transducing part that performs conversion between an electrical signal and sound;

a housing enclosing the sound transducing part and having an opening located between the sound transducing part and the outside of the housing; and the above waterproof sound-permeable membrane according to the present disclosure or the above waterproof sound-permeable member according to the present disclosure, the waterproof sound-permeable membrane or the waterproof sound-permeable member being attached to the housing to cover the opening.

The above waterproof sound-permeable membrane has a relatively low air permeability and has a water entry pressure of 500 kPa or more. In addition, the ratio (T1/T2) between the tensile strengths at break is in the range of 0.5 to 2.0. With these features, high levels of both the sound permeability and water resistance can be achieved, and the decrease in sound permeability (deterioration in acoustic properties) caused by exposure to water pressure can be reduced.

DETAILED DESCRIPTION OF THE INVENTION

Figure 1:
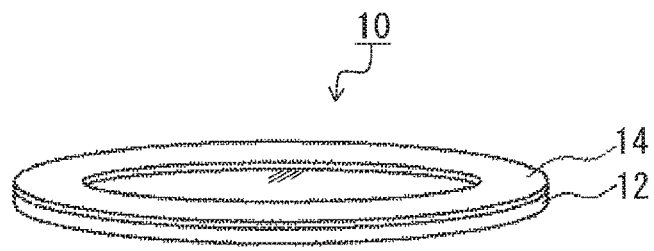
FIG. 1 is a perspective view of a waterproof sound-permeable membrane according to an embodiment of the present disclosure.

The first aspect of the present disclosure provides a waterproof sound-permeable membrane adapted to permit passage of sound and prevent ingress of water, wherein: an air permeability of the waterproof sound-permeable membrane, as expressed by Gurley number, is 20 seconds/100 mL or more; a water entry pressure of the waterproof sound-permeable membrane is 500 kPa or more; and when a tensile strength at break of the waterproof sound-permeable membrane in a MD direction is denoted by T1 and a tensile strength at break of the waterproof sound-permeable membrane in a TD direction orthogonal to the MD direction is denoted by T2, a strength ratio (T1/T2) is in a range of 0.5 to 2.0.

The second aspect of the present disclosure provides the waterproof sound-permeable membrane as set forth in the first aspect, wherein the waterproof sound-permeable membrane is formed of polytetrafluoroethylene.

The third aspect of the present disclosure provides the waterproof sound-permeable membrane as set forth in the first or second aspect, wherein the waterproof sound-permeable membrane is oriented both in the MD direction and in the TD direction.

The fourth aspect of the present disclosure provides the waterproof sound-permeable membrane as set forth in any one of the first to third aspects, wherein the air permeability of the waterproof sound-permeable membrane, as expressed by Gurley number, is 10000 seconds/100 mL or more.

The fifth aspect of the present disclosure provides the waterproof sound-permeable membrane as set forth in any one of the first to third aspects, wherein the air permeability of the waterproof sound-permeable membrane, as expressed by Gurley number, is 20 to 300 seconds/100 mL.

The sixth aspect of the present disclosure provides the waterproof sound-permeable membrane as set forth in any one of the first to fifth aspects, wherein an insertion loss at 1 kHz measured for the waterproof sound-permeable membrane is 13 dB or less when the waterproof sound-permeable membrane has a circular sound-permeable region with a diameter of 1.5 mm.

The seventh aspect of the present disclosure provides the waterproof sound-permeable membrane as set forth in any one of the first to sixth aspects, wherein the waterproof sound-permeable membrane has a surface density of 1 to 30 g/m$^2$.

The eighth aspect of the present disclosure provides a waterproof sound-permeable member including: the waterproof sound-permeable membrane as set forth in any one of the first to seventh aspects; and a bonding layer placed on a surface of the waterproof sound-permeable membrane.

The ninth aspect of the present disclosure provides an electronic device including: a sound transducing part that performs conversion between an electrical signal and sound; a housing enclosing the sound transducing part and having an opening located between the sound transducing part and the outside of the housing; and the waterproof sound-permeable membrane as set forth in any one of the first to seventh aspects or the waterproof sound-permeable member as set forth in the eighth aspect, the waterproof sound-permeable membrane or the waterproof sound-permeable member being attached to the housing to cover the opening.

Hereinafter, an embodiment of the present disclosure will be described with reference to the drawings. The present invention is not limited to the embodiment described below.

As shown in FIG. 1, a waterproof sound-permeable member 10 (which hereinafter may be simply referred to as a "sound-permeable member") according to the present embodiment includes a sound-permeable membrane 12 and a bonding layer 14. The sound-permeable member 10 and the sound-permeable membrane 12 are circular when viewed in plan. The bonding layer 14 is ring-shaped, and is placed on a peripheral portion of one surface of the sound-permeable membrane 12. The region inside the bonding layer 14 (the region not covered by the bonding layer 14) is a sound-permeable region (effective region) of the sound-permeable membrane 12. The sound-permeable member 10 is not limited to being circular, and may have another shape such as an elliptical or rectangular shape.

The sound-permeable membrane 12 is a membrane made of a resin such as PTFE, polyester (PET), polycarbonate, polyethylene, or polyimide. Among these resins, PTFE is suitable for use as the material of the sound-permeable membrane 12. When made of PTFE, the sound-permeable membrane 12 has a good balance between mass and strength and further has a high heat resistance. The attachment of the sound-permeable member 10 to a housing can be followed by a heat treatment (such as a reflow soldering process) when the sound-permeable membrane 12 has a sufficient heat resistance.

In the present embodiment, the sound-permeable membrane 12 is a single-layer resin membrane. The sound-permeable membrane 12 may be a multi-layer membrane obtained by stacking a plurality of membranes on top of each other.

In the present embodiment, the air permeability of the sound-permeable membrane 12, as expressed by Gurley number, is 20 seconds/100 mL or more. That is, the sound-permeable membrane 12 can be a non-porous or microporous membrane. The term "non-porous" as used herein means that the membrane has no or very few pores extending from one principal surface of the membrane to the other principal surface of the membrane. For example, when the air permeability of a membrane, as expressed by Gurley number, is more than 10000 seconds/100 mL, the membrane can be classified as a non-porous membrane. On the other hand, a membrane having an air permeability in the range of 20 to 10000 seconds/100 mL can be classified as a microporous membrane. The air permeability of the microporous membrane may be in the range of 20 to 5000 seconds/100 mL, in the range of 20 to 1000 seconds/100 mL, or in the range of 20 to 300 seconds/100 mL. The lower limit of the air permeability may be 40 seconds/100 mL. The "Gurley number" as used herein refers to a value determined by Method B (Gurley method) of air permeability measurement specified in Japanese Industrial Standards (JIS) L 1096 (2010).

Sound can be transmitted by vibration of the sound-permeable membrane 12, and it is therefore not necessary for the sound-permeable membrane 12 to have air permeability. When the sound-permeable membrane 12 attached to a housing is a non-porous membrane, entry of water vapor into the housing through the sound-permeable membrane 12 can be prevented. The water resistance of a non-porous membrane is typically higher than the water resistance of a porous membrane. In some cases, however, it is desirable for the sound-permeable membrane 12 to have a moderate level of air permeability. For example, when the internal temperature of the housing varies relatively widely, a moderate level of air permeability can be effective for prevention of dew condensation inside the housing. In this case, the sound-permeable membrane 12 is desirably a microporous membrane.

The water entry pressure (threshold water entry pressure) of the sound-permeable membrane 12 is, for example, 500 kPa or more. Having a water entry pressure of 500 kPa corresponds to being waterproof at 5 atm. When the water entry pressure of the sound-permeable membrane 12 is 500 kPa or more, the sound-permeable membrane 12 enables an electronic device to be used in situations such as watersports and works involving frequent contact with water. The upper limit of the water entry pressure is not particularly defined and is, for example, 1000 kPa. The water entry pressure can be measured according to Method B (high hydraulic pressure method) of water penetration test specified in JIS L 1092 (2009). In the measurement, to prevent significant deformation of the membrane, a stainless steel mesh may be placed on a surface of the membrane opposite to the surface to be exposed to a pressure.

An exemplary measure of the water resistance of the sound-permeable membrane 12 is whether the sound-permeable membrane 12 can pass a continuous water pressure loading test. The continuous water pressure loading test is a test for examining whether a membrane is broken or become leaky when continuously exposed to a predetermined water pressure for a predetermined time. The continuous water pressure loading test can be conducted using a water penetration test apparatus specified in JIS L 1092 (2009), similarly to the measurement of the water entry pressure. The sound-permeable membrane 12 according to the present embodiment is not broken and does not become leaky even when continuously exposed to a water pressure of 500 kPa for 10 minutes.

The sound-permeable membrane 12 according to the present embodiment can be a PTFE membrane that has small anisotropy of strength. Specifically, when a tensile strength at break of the sound-permeable membrane 12 in the MD direction (Machine Direction) is denoted by T1 (MPa), and a tensile strength at break of the sound-permeable membrane 12 in the TD direction (Transverse Direction) orthogonal to the MD direction is denoted by T2 (MPa), a ratio (T1/T2) is in the range of 0.5 to 2.0. The MD direction and the TD direction can be distinguished on a scanning electron microscope image of a surface of the sound-permeable membrane 12. In the present embodiment, the "MD direction" is a direction parallel to the direction of calendering of the PTFE membrane and may be referred to as "longitudinal direction" or "machine direction". The "TD direction" is a direction orthogonal to the MD direction and may be referred to as "width direction".

When the strength of a sound-permeable membrane is highly anisotropic, the sound-permeable membrane is believed to be unevenly deformed when exposed to a water pressure. In this case, the sound-permeable membrane is expected to have a shape far from its original shape after being freed from the water pressure. It is also expected that the acoustic properties of the membrane will be significantly deteriorated.

The sound-permeable membrane 12 according to the present embodiment has an air permeability as expressed by Gurley number of 20 seconds/100 mL or more and a water entry pressure of 500 kPa or more. Furthermore, in the sound-permeable membrane 12, the ratio (T1/T2) between tensile strengths at break is in the range of 0.5 to 2.0. The ratio (T1/T2) is desirably in the range of 0.7 to 1.5. These features can prevent the sound-permeable membrane 12 subjected to a water penetration test from having a shape and structure which are far from those of the sound-permeable membrane 12 that has yet to undergo the water penetration test. This can consequently reduce the decrease in sound permeability (deterioration in acoustic properties) caused by the water penetration test.

The tensile strengths at break can be measured according to JIS K 6251 (2010). Specifically, dumbbell specimens as specified in JIS K 6251 (No. 3 dumbbell specimens) are prepared from an original sheet of the sound-permeable membrane 12. The tensile strengths at break of the specimens are measured using a tensile tester at a tensile speed of 300 mm/min at 25° C. Two different specimens can be prepared from the original sheet of the sound-permeable membrane 12 to measure both the tensile strength at break in the longitudinal direction (MD direction) and the tensile strength at break in the width direction (TD direction).

When an original sheet of the sound-permeable membrane 12 is available, the tensile strength at break of the sound-permeable membrane 12 in the MD direction and the tensile strength at break of the sound-permeable membrane 12 in the TD direction can be accurately measured by the above method. At least one selected from the tensile strength at break of the sound-permeable membrane 12 in the MD direction and the tensile strength at break of the sound-permeable membrane 12 in the TD direction is, for example, 30 MPa or more. The upper limit of the tensile strengths at break of the sound-permeable membrane 12 is not particularly defined and is, for example, 150 MPa.

When the sound-permeable membrane 12 is very small, dumbbell specimens of predetermined size cannot be prepared. It is thus probable that the tensile strength at break measured is different from the tensile strength at break of an original sheet of the sound-permeable membrane 12. However, the ratio (T1/T2) between tensile strengths at break can be calculated. For example, several (for example, five) sound-permeable membranes 12 are prepared, the tensile strength at break in the MD direction is measured for each sound-permeable membrane 12, and the average of the measured values is calculated. Similarly, several sound-permeable membranes 12 are prepared, the tensile strength at break in the TD direction is measured for each sound-permeable membrane 12, and the average of the measured values is calculated. The ratio (T1/T2) can be calculated from these averages.

In the present embodiment, the sound-permeable membrane 12 can be composed of oriented PTFE. For example, the sound-permeable membrane 12 can be oriented both in the MD direction and in the TD direction. Such an oriented structure is considered to contribute to a reduction in anisotropy of the tensile strength at break. As is typical in the field of polymers, the term "orientation" is used herein to refer to the orientation of the molecular chain (PTFE chain in this embodiment). Whether PTFE is oriented can be confirmed, for example, by X-ray diffraction (XRD) measurement. Specifically, the sound-permeable membrane 12 is subjected to wide-angle X-ray diffraction (WAXD) measurement to obtain an X-ray diffraction pattern (WAXD profile), based on which whether PTFE is oriented in the sound-permeable membrane 12 can be examined. For example, when a peak is observed in a circumferential intensity profile of a diffraction pattern obtained by wide-angle X-ray diffraction measurement, PTFE is determined to be oriented in the sound-permeable membrane 12. The degree of crystal orientation of PTFE in the sound-permeable membrane 12 can also be determined.

The sound permeability of the sound-permeable membrane 12 can be evaluated, for example, by insertion loss at 1 kHz (insertion loss for sound with a frequency of 1 kHz). In the present embodiment, the insertion loss at 1 kHz measured for the sound-permeable membrane 12 is 13 dB or less when the sound-permeable membrane 12 has a circular sound-permeable region with a diameter of 1.5 mm.

The decrease in sound permeability of the sound-permeable membrane 12 caused by a water penetration test is relatively small. First, for example, the insertion loss at 1 kHz is measured for the sound-permeable membrane 12 having a circular sound-permeable region with a diameter of 1.5 mm. Next, the membrane 12 is subjected to a continuous water pressure loading test according to the method previously described. After that, the insertion loss at 1 kHz is measured again. The difference between the insertion loss measured after the continuous water pressure loading test and the insertion loss measured before the continuous water pressure loading test is, for example, 6 dB or less and desirably 5 dB or less.

The insertion loss (acoustic properties) of the sound-permeable membrane 12 can be measured by a method described later using a simulated housing imitating a housing of a mobile phone.

The surface density of the sound-permeable membrane 12 is, for example, in the range of 1 to 30 $g/m^2$ and may be in the range of 1 to 25 $g/m^2$. The thickness of the sound-permeable membrane 12 is, for example, in the range of 1 to 25 μm and may be in the range of 1 to 20 μm. When the surface density and thickness are adjusted to appropriate ranges, the water resistance and sound permeability of the sound-permeable membrane 12 are likely to be well balanced. The surface density refers to the mass per unit area of the membrane and is calculated by dividing the total mass of the membrane by the area (the area of a principal surface) of the membrane.

When the sound-permeable membrane 12 is a microporous membrane, the average pore diameter of the sound-permeable membrane 12 is, for example, in the range of 0.01 μm to 1 μm. The porosity of the sound-permeable membrane 12 is, for example, in the range of 5 to 50%. When the average pore diameter and porosity are adjusted to appropriate ranges, the sound permeability and water resistance of the sound-permeable membrane 12 are likely to be well balanced. The average pore diameter can be measured by a method according to American Society for Testing and Materials (ASTM) F 316-86. The porosity can be calculated by substituting the mass, volume, and true density of the sound-permeable membrane 12 into the equation given below. For example, when the material of the sound-permeable membrane 12 is PTFE, the true density of the membrane is 2.18 $g/cm^3$.

$$\text{Porosity (\%)} = \{1 - (\text{mass [g]}/(\text{thickness [cm]} \times \text{area [cm}^2\text{]} \times \text{true density}[2.18 \text{ g/cm}^3]))\} \times 100$$

The bonding layer 14 is constituted by, for example, a double-coated adhesive (pressure-sensitive) tape. The double-coated adhesive tape includes, for example, a base material, an adhesive layer (pressure-sensitive adhesive layer) applied to one side of the base material, and an adhesive layer applied to the other side of the base material. Examples of the adhesive used in the double-coated adhesive tape include an epoxy adhesive, an acrylic adhesive, and a silicone adhesive. The bonding layer 14 may be formed only of such an adhesive. The bonding layer 14 may be formed on each of the principal surfaces of the sound-permeable membrane 12.

The sound-permeable membrane 12 can be attached directly to a housing without the use of the bonding layer 14. For example, the sound-permeable membrane 12 is welded directly to a housing by a welding technique such as thermal welding or laser welding.

The sound-permeable membrane 12 may include an air-permeable supporting member stacked on a non-porous membrane or microporous membrane. The air-permeable supporting member has the function of supporting the non-porous membrane or microporous membrane. The air-permeable supporting member is typically a woven fabric, non-woven fabric, mesh, net, sponge, foam, or porous body made of a metal, resin, or composite thereof. Examples of the resin include polyolefin, polyester, polyamide, polyimide, aramid, fluorine resin, and ultrahigh molecular weight polyethylene. The air-permeable supporting member can be stacked on a non-porous membrane or microporous membrane by a bonding technique such as thermal lamination, thermal welding, or ultrasonic welding. When viewed in plan, the air-permeable supporting member may have the same shape as the sound-permeable membrane 12 or may have the same shape as the bonding layer 14 (a ring shape).

The sound-permeable membrane 12 may be subjected to a coloring treatment. In other words, the sound-permeable membrane 12 may contain a colorant such as carbon black. For example, when containing carbon black, the sound-permeable membrane 12 has a grayish or blackish color. "Having a grayish or blackish color" means that the membrane contains a colorant for coloring the membrane black. In general, the color of the membrane is determined to be "black" when the blackness as defined in JIS Z 8721 (1993) is 1 to 4, "gray" when the blackness is 5 to 8, and "white" when the blackness is 9 or more.

Next, an exemplary method for producing the sound-permeable membrane 12 will be described.

First, a dispersion of a PTFE powder (PTFE dispersion) is applied to a substrate to form a coating. The dispersion may contain a colorant. The substrate can be formed of a heat-resistant material such as a heat-resistant plastic (such as polyimide or polyetheretherketone), metal, or ceramic. The substrate is not particularly limited in shape, and may be, for example, in a sheet shape, tubular shape, or rod shape. The application of the dispersion to the substrate can be accomplished by various methods, such as by dipping the substrate in the dispersion and then withdrawing the substrate from the dispersion, by spraying the dispersion onto the substrate, or by spreading the dispersion over the substrate with a brush. To improve the wetting properties of the dispersion on the substrate surface, a surfactant such as a silicone surfactant or fluorine surfactant may be incorporated in the dispersion.

Next, the coating is heated. This heating removes the dispersion medium from the coating and at the same time allows the PTFE particles to be bound together. The heating results in the formation of a non-porous PTFE membrane on one or both surfaces of the substrate. For example, the dispersion medium is removed by heating the coating at a temperature at which the dispersion medium can evaporate, and then the coating is sintered by heating the coating at a temperature equal to or higher than the melting point of PTFE. When the dispersion medium is water, the coating is heated at 90 to 150° C. in the first stage and then at 350 to 400° C. in the second stage. It should be understood that one-stage heating may be employed in which the coating is heated at a temperature equal to or higher than the melting point of PTFE for a predetermined time.

The step of forming a coating by applying the dispersion to the substrate and the step of heating the coating may be repeated to form a PTFE membrane having a desired thickness. These steps may each be performed only once.

Next, the PTFE membrane (thin resin film) is separated from the substrate. This is followed by the step of calendering the PTFE membrane in the MD direction (longitudinal direction) and then by the step of stretching the PTFE membrane in the TD direction (width direction). The sound-permeable membrane 12 is thus obtained in the form of a microporous membrane. The order of the steps of calendering the PTFE membrane in the MD direction and stretching the PTFE membrane in the TD direction may be reversed. When the stretching step precedes the calendering step, the pores formed by the stretching in the TD direction are squashed by the calendering, in consequence of which the sound-permeable membrane 12 is obtained in the form of a non-porous membrane. In the process of forming a non-porous membrane or microporous membrane, the PTFE membrane may be stretched in the MD direction. The calendering ratio and stretching ratio can be appropriately set in consideration of the balance between the waterproofness and sound permeability. The calendering ratio in the MD direction is, for example, 1.25 to 3.5. The stretching ratio in the TD direction is, for example, 1.25 to 3.5. The step of stretching the PTFE membrane in the TD direction may be replaced by the step of calendering the PTFE membrane in the TD direction.

The method for calendering the PTFE membrane is, for example, press calendering or roll calendering. The press calendering is hot plate calendering in which the PTFE membrane is calendered under heating by pressing the PTFE membrane between a pair of heated plates. In the roll calendering, for example, the PTFE membrane is calendered under heating by passing the PTFE membrane between a pair of rolls (one or both of which is or are heated). Of the two calendering methods, the roll calendering is more desired, since the roll calendering allows easy control of the direction of orientation of PTFE and continuous calendering of the PTFE membrane that is in the shape of a long strip. The calendering may be repeated twice or more if necessary, and the calendering direction may be the same for all the repetitions or different for each repetition.

The heating temperature employed in the calendering of the PTFE membrane is, for example, 80 to 200° C. Also in the step of stretching the PTFE membrane, the PTFE membrane can be stretched under heating. The heating temperature employed in the stretching of the PTFE membrane is, for example, 100 to 400° C. Each of the heating temperatures can be the temperature of the atmosphere surrounding the PTFE membrane in a calendering machine or stretching machine.

The separation of the PTFE membrane from the substrate may be followed by a treatment for modifying at least a portion of the surface of the PTFE membrane. Carrying out such a treatment improves the bond strength of the sound-permeable membrane 12 to another material (such as an adhesive). The surface modification treatment is, for example, a PTFE modification treatment such as a chemical treatment or sputter etching treatment. The surface modification treatment may precede the calendering and stretching steps or may follow these steps.

The chemical treatment is, for example, a treatment with an alkali metal such as sodium (alkali metal treatment). In the alkali metal treatment, for example, an etchant containing metallic sodium and the PTFE membrane are brought into contact. This contact induces withdrawal of fluorine atoms and hence formation of functional groups in the portion of the PTFE membrane that has contacted the etchant, thus leading to enhanced bond strength. To bring the etchant and the PTFE film into contact, the PTFE membrane may be dipped in the etchant.

The etchant is, for example, a metallic sodium/liquid ammonia solution containing metallic sodium dissolved in liquid ammonia or a metallic sodium/naphthalene solution containing metallic sodium dissolved in a naphthalene solution. Of these two solutions, the metallic sodium/naphthalene solution is more desired, since this solution is easy to manage and handle and also allows the treatment to be carried out without the need for a low temperature of around −50° C.

In the sputter etching treatment, a surface of the PTFE film is bombarded with energy particles derived from a gas. Atoms or molecules are emitted from the surface of the particle-bombarded portion of the PTFE membrane, and this results in the formation of functional groups in the portion, leading to enhanced bond strength. The sputter-etching treatment can be carried out, for example, by placing the PTFE membrane in a chamber, then reducing the pressure inside the chamber, and subsequently applying a high-frequency voltage while introducing an atmosphere gas.

The atmosphere gas is, for example, at least one selected from the group consisting of noble gases such as helium, neon, argon, and krypton; nitrogen gas; and oxygen gas. The frequency of the high-frequency voltage applied is, for example, 1 to 100 MHz and desirably 5 to 50 MHz. The pressure inside the chamber during the application of the high-frequency voltage is, for example, 0.05 to 200 Pa and desirably 1 to 100 Pa. The sputter etching energy (corresponding to the treatment time multiplied by the applied voltage) is, for example, 1 to 1000 $J/cm^2$ and desirably 2 to 200 $J/cm^2$.

After production of the sound-permeable membrane 12 by the procedures described above, the bonding layer 14 is formed on a surface of the sound-permeable membrane 12 using a double-coated adhesive tape. The sound-permeable member 10 shown in FIG. 1 is thus obtained.

Figure 2:
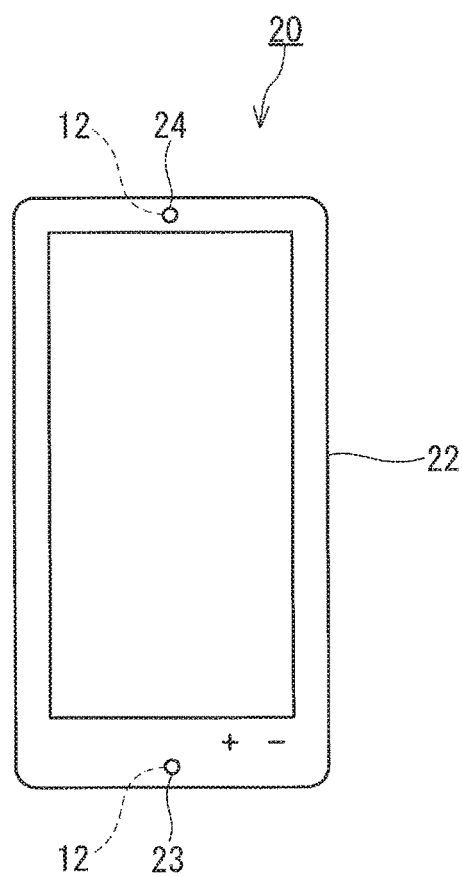
FIG. 2 is a front view of a smartphone having a housing to which the waterproof sound-permeable member or waterproof sound-permeable membrane according to the embodiment is attached.

FIG. 2 shows an exemplary electronic device in which the sound-permeable member 10 is used. The electronic device shown in FIG. 2 is a smartphone 20. Inside the housing 22 of the smartphone 20 there are placed sound transducers serving as sound transducing parts that perform conversion between an electrical signal and sound. Examples of the sound transducers include a speaker and a microphone. The housing 22 is provided with openings 23 and 24. The openings 23 and 24 are located between the sound transducers and the outside of the housing. The sound-permeable members 10 are attached to the inner surface of the housing 22 to cover the openings 23 and 24. This prevents ingress of foreign matters such as water and dust into the housing 22, thereby protecting the sound transducers. Sound traveling toward a sound transducer and/or sound emitted from the sound transducer passes through the sound-permeable member 10 and sound-permeable membrane 12. Only the sound-permeable membrane 12, rather than the sound-permeable member 10, may be attached directly to the housing 22 by a technique such as thermal welding or ultrasonic welding.

The electronic device is not limited to the smartphone 20. The sound-permeable member 10 and sound-permeable membrane 12 according to the present embodiment are applicable to various electronic devices such as laptop computers, electronic notebooks, digital cameras, game consoles, portable audio devices, and wearable terminals. The scope of housings to which the sound-permeable member 10 and sound-permeable membrane 12 are attachable encompasses a wide variety of products, including a package in which a microphone is placed and a circuit board on which an electronic part is mounted.

EXAMPLES

Hereinafter, the present invention will be described in more detail by way of examples. The present invention is not limited to the examples given below.

The methods for evaluation of sound-permeable membranes (samples 1 to 12) will first be described.

[Thickness]

The thickness of each sound-permeable membrane was determined as follows: Ten circular pieces with a diameter of 48 mm were punched from the sound-permeable membrane, the total thickness of the ten circular pieces placed on top of each other was measured with a micrometer, and the measured value was divided by 10.

[Surface Density]

The surface density of each sound-permeable membrane was determined as follows: a circular piece with a diameter of 48 mm was punched from the sound-permeable membrane, the mass of the circular piece was measured, and the mass of the circular piece per 1 $m^2$ of its principal surface was calculated from the measured mass.

[Tensile Strength at Break]

The tensile strengths at break of each sound-permeable membrane were measured according to JIS K 6251 (2010). Specifically, two dumbbell specimens as specified in JIS K 6251 (No. 3 dumbbell specimens) were punched from the sound-permeable membrane, and the tensile strengths at break of the dumbbell specimens were measured. One of the dumbbell specimens was prepared in such a manner that measurement of the tensile strength at break in the longitudinal direction (MD) was possible, and the other was prepared in such a manner that the tensile strength at break in the width direction (TD) was possible. The measurement was conducted using a desktop precision universal testing machine (Autograph AGS-X manufactured by Shimadzu Corporation) at a tensile speed of 300 mm/min at 25° C.

[Water Entry Pressure]

The water entry pressure (threshold water entry pressure) of each sound-permeable membrane was measured according to Method B (high hydraulic pressure method) of water penetration test specified in JIS L 1092. In this measurement, the membrane had a circular sound-permeable region with a diameter of 2.0 mm. The continuous water pressure loading test was conducted by the method previously described. In the continuous water pressure loading test, the sound-permeable membrane was rated as "good" if the membrane was not broken and did not become leaky, and otherwise as "poor".

[Insertion Loss]

The insertion loss of each sound-permeable membrane was measured before and after the continuous water pressure loading test. In this measurement, the membrane had a circular sound-permeable region with a diameter of 1.5 mm. Specifically, the insertion loss of the sound-permeable membrane was measured by the following procedures using a simulated housing imitating a housing of a mobile phone.

Figure 3:
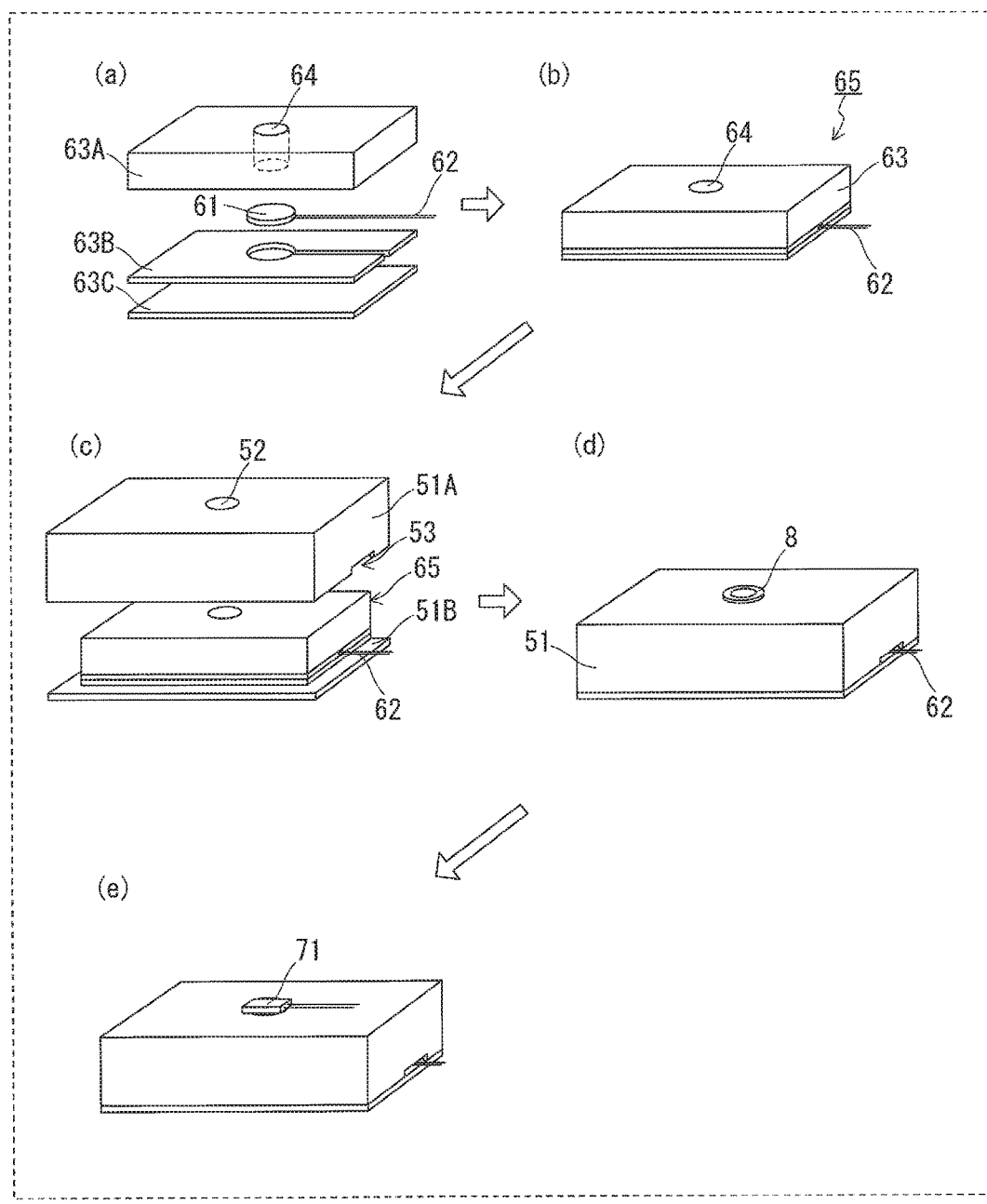
FIG. 3 is a process diagram showing procedures of measurement of the acoustic properties of sound-permeable membranes.

A speaker unit 65 to be enclosed in the simulated housing was fabricated as shown in (a) and (b) of FIG. 3. The details will now be described. First, the following were prepared: a speaker 61 (SCC-16A, manufactured by STAR MICRONICS CO., LTD) to be used as a sound source; and fillers 63A, 63B, and 63C made of urethane sponge for enclosing the speaker 61 and minimizing diffusion of sound from the speaker (for preventing generation of sound entering the microphone for evaluation without passing through the sound-permeable membrane). The filler 63A is provided with a sound transmission hole 64 having a cross-section in the shape of a 5-mm-diameter circle and extending in the thickness direction of the filler 63A. The filler 63B is provided with a cutout conforming to the shape of the speaker 61 to be placed therein and a cutout for placing a speaker cable 62 therein and leading the cable 62 to the outside of the unit 65. Next, the filler 63B was placed on the filler 63C, and the speaker 61 and cable 62 were placed in the cutouts of the filler 63B, after which the filler 63A was placed on the filler 63B in such a manner as to allow sound to be transmitted from the speaker 61 to the outside of the unit 65 through the sound transmission hole 64. The speaker unit 65 was thus obtained (see (b) of FIG. 3).

Next, as shown in (c) of FIG. 3, the speaker unit 65 fabricated as above was placed inside a simulated housing 51 (made of polystyrene and having outer dimensions of 60 mm×50 mm×28 mm) imitating a housing of a mobile phone. The details will now be described. The simulated housing 51 prepared consists of two parts 51A and 51B, and the parts 51A and 51B are able to be fitted to each other. The part 51A is provided with a sound transmission hole 52 (having a cross-section in the shape of a 2-mm-diameter circle) for transmitting sound emitted from the speaker unit 65 enclosed in the housing 51 to the outside of the housing 51 and a guide hole 53 for leading the speaker cable 62 to the outside of the housing 51. When the parts 51A and 51B are fitted together, a space having no openings other than the sound transmission hole 52 and the guide hole 53 is created inside the housing 51. The fabricated speaker unit 65 was placed on the part 51B, and the part 51A was then placed over the unit 65 and fitted to the part 51B. The unit 65 was thus enclosed in the housing 51. This was done in such a manner that the sound transmission hole 64 of the unit 65 and the sound transmission hole 52 of the part 51A overlapped each other to allow sound to be transmitted from the speaker 61 to the outside of the housing 51 through both of the sound transmission holes 64 and 52. The speaker cable 62 was led to the outside of the housing 51 through the guide hole 53, and the guide hole 53 was filled with putty.

Meanwhile, a specimen 83 in the shape of a 5.8-mm-diameter circle was punched using a Thomson die from each of the sound-permeable membranes fabricated. Next, a ring-shaped double-coated adhesive tape 82 (No. 5603, manufactured by NITTO DENKO CORPORATION, having a thickness of 0.03 mm, and including a base material of polyethylene terephthalate (PET)) with an outer diameter of 5.8 mm and an inner diameter of 1.5 mm was bonded to a peripheral portion of one principal surface of the specimen 83, and a ring-shaped double-coated adhesive tape 84 (No. 57120B, manufactured by NITTO DENKO CORPORATION, having a thickness of 0.20 mm, and including a base material of polyethylene foam) with an outer diameter of 5.8 mm and an inner diameter of 1.5 mm was bonded to a peripheral portion of the other principal surface of the specimen 83. The bonding was done in such a manner that the entire outer peripheries of the specimen and tapes exactly overlapped each other. Next, a ring-shaped PET sheet 81 (having a thickness of 0.1 mm) having the same outer diameter and inner diameter as mentioned above was bonded to the surface of the double-coated adhesive tape 82 remote from the specimen 83 in such a manner that the entire outer peripheries of the PET sheet 81 and the double-coated adhesive tape 82 exactly overlapped each other. A laminate 8 was thus obtained (see FIG. 4). In the laminate 8, the region inside the ring defined by the ring-shaped PET sheet 81 and double-coated adhesive tapes 82 and 84 serves as a sound transmission hole in which sound passes through the specimen 83.

Figure 4:
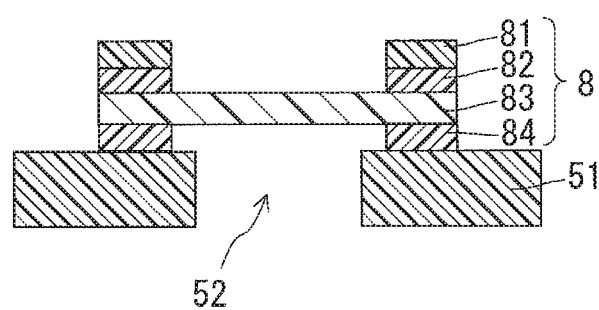
FIG. 4 is a cross-sectional view illustrating how a sound-permeable membrane is set in measurement of the acoustic properties of the membrane.

Next, as shown in (d) of FIG. 3 and FIG. 4, the laminate 8 including the specimen 83 was fixedly attached over the sound transmission hole 52 of the housing 51 via the double-coated adhesive tape 84. This was done in such a manner that the specimen 83 fully covered the sound transmission hole 52 and that any gap was formed neither between the members constituting the laminate 8 nor between the double-coated adhesive tape 84 and the housing 51. The double-faced tape 84 was placed so as not to overlap the sound transmission hole 52.

Next, as shown in (e) of FIG. 3, a microphone 71 (Spm 0405Hd4H-W8 manufactured by Knowles Acoustics) was placed to cover the laminate 8 including the specimen 83. The distance between the microphone 71 thus placed and the speaker 61 was 21 mm. The speaker 61 and the microphone 71 were then connected to an acoustic evaluation system (Multi-analyzer System 3560-W030 manufactured by B&K Sound & Vibration Measurement A/S). Solid state response (SSR) mode (test signals of 20 Hz to 20 kHz, sweep up) was selected as an evaluation mode and carried out to evaluate the insertion loss of the specimen 83. The insertion loss was automatically determined on the basis of a test signal input to the speaker 61 from the acoustic evaluation system and a signal received by the microphone 71. To evaluate the insertion loss of the specimen 83, the value (blank value) of insertion loss in the absence of the specimen 83 was determined beforehand. The blank value was −21 dB at a frequency of 1000 Hz. The insertion loss of the sound-permeable membrane corresponds to a value calculated by subtracting the blank value from the value measured by the acoustic evaluation system. The insertion loss of the sound-permeable membrane was determined for sound with a frequency of 1000 Hz. A smaller insertion loss indicates better maintenance of the level (volume) of the sound output from the speaker 61.

[Degree of Crystal Orientation]

The degree of crystal orientation in each sound-permeable membrane was calculated from the result of wide-angle X-ray diffraction (XRD) measurement of the sound-permeable membrane. The XRD measurement was performed using a X-ray diffractometer (D8 DISCOVER with GADDS Super Speed, manufactured by Bruker Corporation). Specifically, the sample (sound-permeable membrane) was fixed with a holder in such a manner as to allow recognition of the MD direction of the sample, and a transmission X-ray diffraction pattern (WAXD pattern; a two-dimensional image in reciprocal space) of the membrane was obtained by causing X-rays to pass through the sample in its thickness direction. Whether PTFE was oriented in the sound-permeable membrane was determined from the obtained WAXD pattern, and the degree of orientation of PTFE was determined using the following equation (1).

$$\text{Degree of orientation (\%)} = (1 - \Sigma FWHM/360) \times 100(\%) \quad (1)$$

In the equation (1), ΣFWHM denotes a peak half-width (in units of degrees) in a circumferential direction of a peak pattern attributed to the crystal structure of PTFE and observed at a diffraction angle 2θ of around 18° in the obtained WAXD pattern. When PTFE is non-oriented, the peak pattern in the WAXD pattern takes the shape of a ring having a radius corresponding to 2θ=18°. In this case, since peaks are distributed over the entire circumference of the ring, ΣFWHM is 360°, and the degree of orientation as calculated by the equation (1) is 0%. As PTFE becomes oriented, the ring-shaped peak pattern appearing in the WAXD pattern is divided, and peaks are concentrated at specific portions of the ring according to the direction of orientation so that the value of ΣFWHM decreases. That is, the degree of orientation as calculated by the equation (1) increases. In addition, the direction of orientation in the sound-permeable membrane can be determined on the basis of where the peaks are concentrated.

The measurement conditions were as follows.

Emitting-side Optical System

X ray: Cu-Kα ray (λ=0.1542 nm), Monochromator: Multilayer mirror, Collimator: 300 μm Voltage applied to Cu target: 50 kV Current applied to Cu target: 100 mA Receiving-side Optical System Counter: Two-dimensional position sensitive proportional counter (PSPC) (Hi-STAR, manufactured by Bruker Corporation)

Camera distance: 9 cm

Measurement time: 10 minutes (Sample 1)

To a PTFE dispersion (containing 40 mass % of a PTFE powder with an average particle diameter of 0.2 μm and containing 6 parts by mass of a nonionic surfactant relative to 100 parts by mass of PTFE) there was added a fluorinated surfactant (Megaface F-142D manufactured by DIC Corporation) in an amount of 1 part by mass relative to 100 parts by mass of PTFE. Next, a strip-shaped polyimide film (thickness: 125 μm) was dipped in, and withdrawn from, the PTFE dispersion to form a coating of the PTFE dispersion on the film. The thickness of the coating was controlled to 20 μm by means of a metering bar. Subsequently, the coating was heated at 100° C. for 1 minute and then at 390° C. for 1 minute to evaporate and thereby remove water from the dispersion and at the same time to bind the remaining PTFE particles together. A PTFE membrane was thus obtained. The dipping and heating were further repeated twice, after which the resulting PTFE membrane (thickness: 25 μm) was separated from the polyimide film.

Next, the PTFE membrane thus obtained was stretched by a tenter in the TD direction at a stretching ratio of 2. The PTFE membrane was then calendered in the MD direction at a calendering ratio of 2.5. A sound-permeable membrane as sample 1 was thus obtained. The temperatures of the rolls of the calendering machine were set at 170° C. The stretching temperature was 170° C. The calendering temperature and stretching temperature were the same for the other samples described below except sample 12.

(Sample 2)

A PTFE membrane was produced in the same manner as for sample 1. The PTFE membrane produced was then calendered in the MD direction at a calendering ratio of 2.5. The calendered PTFE membrane was stretched by a tenter in the TD direction at a stretching ratio of 1.5. A sound-permeable membrane as sample 2 was thus obtained.

(Sample 3)

A sound-permeable membrane as sample 3 was obtained in the same manner as for sample 2, except for changing the stretching ratio in the TD direction to 2.0.

(Sample 4)

A sound-permeable membrane as sample 4 was obtained in the same manner as for sample 2, except for changing the stretching ratio in the TD direction to 2.5.

(Sample 5)

A sound-permeable membrane as sample 5 was obtained in the same manner as for sample 2, except for changing the stretching ratio in the TD direction to 3.0.

(Sample 6)

A PTFE molding powder (TFEM-12 manufactured by DAIKIN INDUSTRIES, LTD.) in an amount of 100 parts by mass was charged into a mold having the shape of a cylinder having a height of 800 mm and an inner diameter of 200 mm (it should be noted that the bottom of the cylinder was closed) and was preformed under a pressure of 280 kg/cm$^2$ for 1 hour. Next, the resulting preformed product of PTFE was removed from the mold, and then sintered at a temperature of 360° C. for 48 hours to give a PTFE block in the shape of a cylinder having a height of about 500 mm and a diameter of about 200 mm. This block was then placed in a stainless steel vessel having a height of 700 mm and an inner diameter of 200 mm, and the inside of the vessel was purged with nitrogen. After that, the block was further sintered at a temperature of 340° C. for 20 hours to obtain a cylindrical PTFE block to be skived.

Next, the obtained PTFE block was skived with a cutting lathe to obtain a 25-μm-thick PTFE film (skived film). The skived film was calendered in the same manner as for sample 1, and thus a sound-permeable membrane as sample 6 was obtained.

(Sample 7)

A sound-permeable membrane prepared as sample 7 was a 2-μm-thick PET film (SC75 manufactured by SKC Co., Ltd.).

(Sample 8)

A sound-permeable membrane as sample 8 was obtained in the same manner as for sample 1, except for omitting the stretching in the TD direction. It should be noted that the calendering ratio was adjusted to allow the obtained membrane to have a thickness of 10 μm.

(Sample 9)

A sound-permeable membrane as sample 9 was obtained in the same manner as for sample 1, except for omitting the calendering in the MD direction. It should be noted that the stretching ratio was adjusted to allow the obtained membrane to have a thickness of 11 μm.

(Sample 10)

A sound-permeable membrane as sample 10 was obtained in the same manner as for sample 1, except for omitting the stretching in the TD direction. It should be noted that the calendering ratio was adjusted to allow the obtained membrane to have a thickness of 13 μm.

(Sample 11)

A sound-permeable membrane as sample 11 was obtained in the same manner as for sample 1, except for changing the stretching ratio in the TD direction to 4.0 and the calendering ratio in the MD direction to 3.0.

(Sample 12)

To a PTFE dispersion (containing 40 mass % of a PTFE powder with an average particle diameter of 0.2 μm and containing 6 parts by mass of a nonionic surfactant relative to 100 parts by mass of PTFE) there was added a fluorinated surfactant (Megaface F-142D manufactured by DIC Corporation) in an amount of 1 part by mass relative to 100 parts by mass of PTFE. Next, a strip-shaped polyimide film (thickness: 125 μm) was dipped in, and withdrawn from, the PTFE dispersion to form a coating of the PTFE dispersion on the film. The thickness of the coating was controlled to 13 μm by means of a metering bar. Subsequently, the coating was heated at 100° C. for 1 minute and then at 390° C. for 1 minute to evaporate and thereby remove water from the dispersion and at the same time to bind the remaining PTFE particles together. A PTFE membrane was thus obtained. The dipping and heating were further repeated three times, after which the resulting PTFE membrane (thickness: 14 μm) was separated from the polyimide film.

Next, the PTFE membrane thus obtained was stretched in the MD direction at a stretching ratio of 2.0. A sound-permeable membrane as sample 12 was thus obtained. The stretching temperature was 150° C.

For the sound-permeable membranes as samples 1 to 12, the air permeability, threshold water entry pressure, surface density, thickness, and tensile strength at break were measured. In addition, the sound-permeable membranes (Dia.=2.0 mm) as samples 1 to 12 were subjected to a continuous water pressure loading test. Furthermore, the sound-permeable membranes (Dia.=1.5 mm) as samples 1 to 12 were subjected to a continuous water pressure loading test, and the sound permeability of the sound-permeable membranes was measured before and after the continuous water pressure loading test. The sound permeability measurement following the continuous water pressure loading test was conducted after the sound-permeable membrane having undergone the continuous water pressure loading test was left for 10 minutes. The results are shown in Table 1.

TABLE 1

| | | Water entry pressure (Dia. = 2.0 mm) | | Sound permeability (dB, 1 kHz, Dia. = 1.5 mm) | | |
| --- | --- | --- | --- | --- | --- | --- |
| | | | | Before | After continuous | |
| Sample No. | Air permeability (sec/100 mL) | Threshold water entry pressure (kPa) | Continuous water pressure loading test (500 kPa × 10 min) | continuous water pressure loading test | water pressure loading test (500 kPa × 10 min) | Amount of change |
| 1 | 10000< | 1020 | Good | 12.6 | 14.7 | 2.1 |
| 2 | 185 | 713 | Good | 12.7 | 17.5 | 4.8 |
| 3 | 68 | 747 | Good | 10.7 | 13.3 | 2.6 |
| 4 | 48 | 753 | Good | 7.5 | 11.3 | 3.8 |
| 5 | 20 | 550 | Good | 7.1 | 11.7 | 4.6 |

TABLE 1-continued

| | | | | | | |
|---|---|---|---|---|---|---|
| 6 | 10000< | 308 | Poor | 15.8 | — | — |
| 7 | 10000< | 460 | Poor | 12.8 | — | — |
| 8 | 10000< | 744 | Good | 13.7 | 20.1 | 6.4 |
| 9 | 10000< | 1018 | Good | 11.9 | 17.1 | 5.2 |
| 10 | 10000< | 795 | Good | 12.6 | 17.5 | 4.9 |
| 11 | 10000< | 507 | Good | 6.2 | 10.1 | 3.9 |
| 12 | 10000< | 720 | Good | 15.6 | 20.9 | 5.3 |

| | | | Tensile strength at break | | | |
|---|---|---|---|---|---|---|
| Sample No. | Surface density (g/m²) | Thickness (μm) | MD direction (MPa) | TD direction (MPa) | Difference in strength (MPa) | T1/T2 |
| 1 | 15.6 | 10 | 79 | 102 | 23 | 0.77 |
| 2 | 17.6 | 9 | 89 | 71 | 18 | 1.25 |
| 3 | 13.0 | 8 | 90 | 80 | 10 | 1.13 |
| 4 | 10.5 | 7 | 86 | 82 | 4 | 1.05 |
| 5 | 7.9 | 5 | 84 | 76 | 8 | 1.11 |
| 6 | 20.0 | 10 | 94 | 34 | 60 | 2.76 |
| 7 | 2.2 | 2 | — | — | — | — |
| 8 | 20.0 | 10 | 118 | 53 | 65 | 2.23 |
| 9 | 25.0 | 11 | 64 | 111 | 47 | 0.58 |
| 10 | 20.0 | 13 | 123 | 64 | 59 | 1.92 |
| 11 | 5.3 | 4 | 55 | 61 | 6 | 0.90 |
| 12 | 20.1 | 10 | 155 | 74 | 81 | 2.09 |

For the sound-permeable membranes as samples 1 and 6 to 12, the air permeability as expressed by Gurley number was more than 10000 seconds/100 mL as shown in Table 1. This means that these membranes were non-porous membranes. On the other hand, for the sound-permeable membranes as samples 2 to 5, the air permeability as expressed by Gurley number was 20 to 185 seconds/100 mL. This means that the sound-permeable membranes as samples 2 to 5 were microporous membranes.

For the sound-permeable membranes as samples 6 and 7, the threshold water entry pressure was less than 500 kPa. The sound-permeable membranes as samples 6 and 7 failed to pass the continuous water pressure loading test. On the other hand, for the sound-permeable membranes as samples 1 to 5 and 9 to 11, the threshold water entry pressure was 500 kPa or more. In particular, the threshold water entry pressure was 700 kPa or more for the sound-permeable membranes as samples 1 to 4, 9, and 10. The sound-permeable membranes as samples 1 to 5 and 9 to 11 successfully passed the continuous water pressure loading test.

The sound-permeable membranes as samples 1 to 5 and 9 to 11 showed good sound permeability (12.7 dR or less) before the continuous water pressure loading test. After the continuous water pressure loading test, the sound permeability of the sound-permeable membranes as samples 1 to 5 and 9 to 11 was less than 20 dB. The amount of change in sound permeability of the sound-permeable membranes as samples 1 to 5 and 9 to 11 was 5.2 dB or less. In particular, the amount of change in sound permeability of the sound-permeable membranes as samples 1 to 5, 10, and 11 was 5.0 dB or less, and more specifically 4.9 dB or less. In particular, the amount of change in sound permeability of the sound-permeable membranes as samples 1 to 5 and 11 was 4.8 dB or less. By contrast, the amount of change in sound permeability of the sound-permeable membranes as samples 8 and 12 was 5.3 dB or more. In particular, the sound permeability of the sound-permeable membrane as sample 8 was significantly decreased after the continuous water pressure loading test. The sound permeability of the sound-permeable membranes as samples 6 and 7 was not measurable after the continuous water pressure loading test because they failed to pass the test.

For all of samples 1 to 5 and 9 to 11, the ratio (T1/T2) of the tensile strength at break in the MD direction to the tensile strength at break in the TD direction was in the range of 0.5 to 2.0 (more specifically 0.58 to 1.92). For samples 1 to 5 and 11, the ratio was in the range of 0.77 to 1.25. On the other hand, for samples 6, 8, and 12, the ratio (T1/T2) between the tensile strengths at break was more than 2.0. The tensile strengths at break of sample 7 (PET film) were not measurable because the MD direction and TD direction of sample 7 were not clearly distinguishable.

Figure 5:
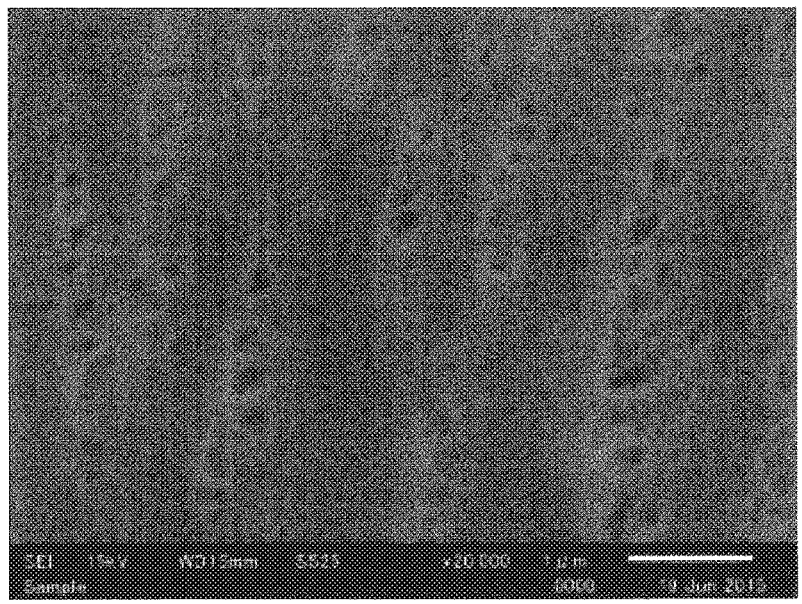
FIG. 5 is a scanning electron microscope (SEM) image (at a magnification of 20000) of a front surface of a sound-permeable membrane as sample 2.
Figure 6:
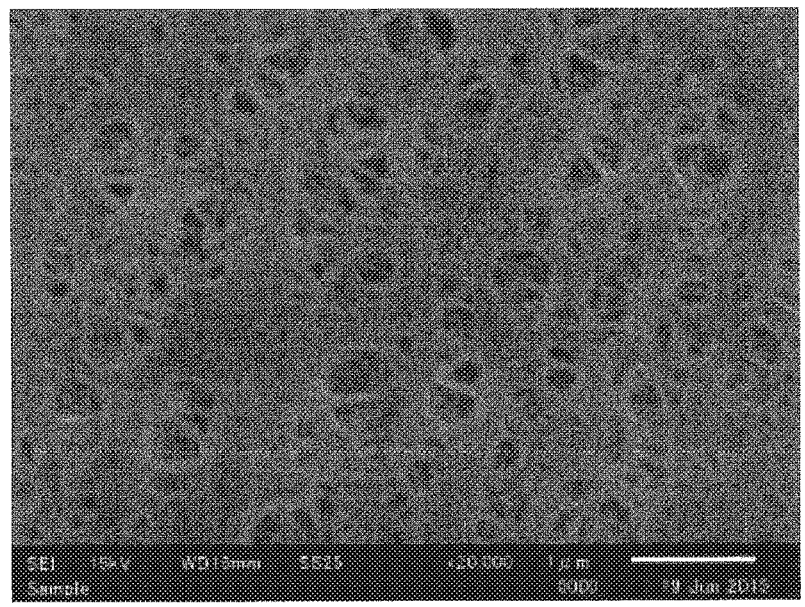
FIG. 6 is a SEM image (at a magnification of 20000) of a back surface of a sound-permeable membrane as sample 3.

FIG. 5 shows a SEM image of a surface of the sound-permeable membrane as sample 2. FIG. 6 shows a SEM image of the sound-permeable membrane as sample 3.

As seen from FIG. 5 and FIG. 6, the sound-permeable membrane as sample 3 had a structure analogous to that of the sound-permeable membrane as sample 2. The stretching ratio in the TD direction for sample 3 was higher than the stretching ratio in the TD direction for sample 2. This is presumably why the porosity of the sound-permeable membrane as sample 3 was higher than the porosity of the sound-permeable membrane as sample 2.

Figure 7A:
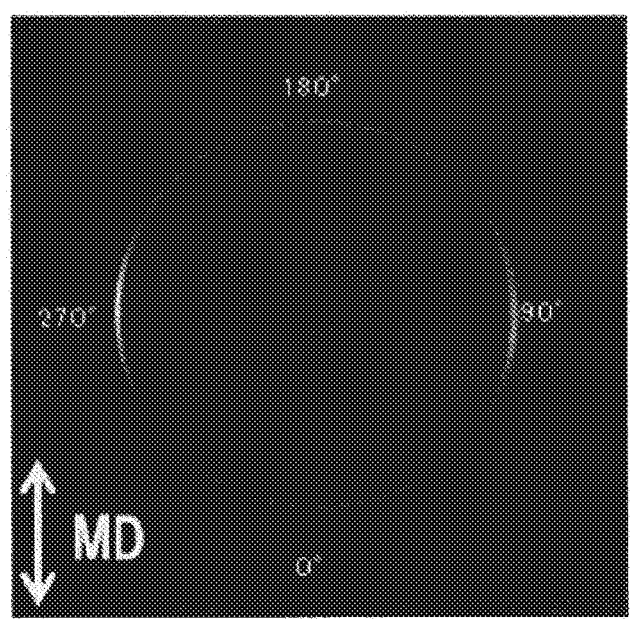
FIG. 7A is a transmission X-ray diffraction pattern of the sound-permeable membrane as sample 3.
Figure 7B:
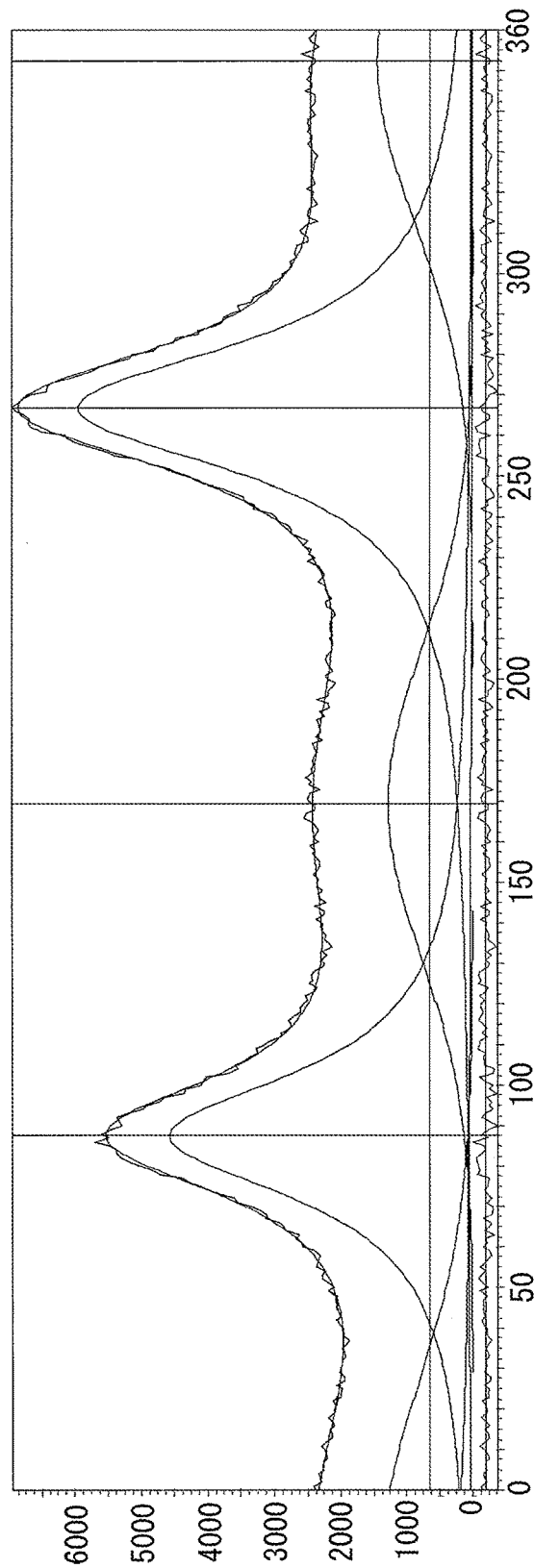
FIG. 7B is a circumferential intensity profile of the diffraction pattern of the sound-permeable membrane as sample 3.
Figure 8A:
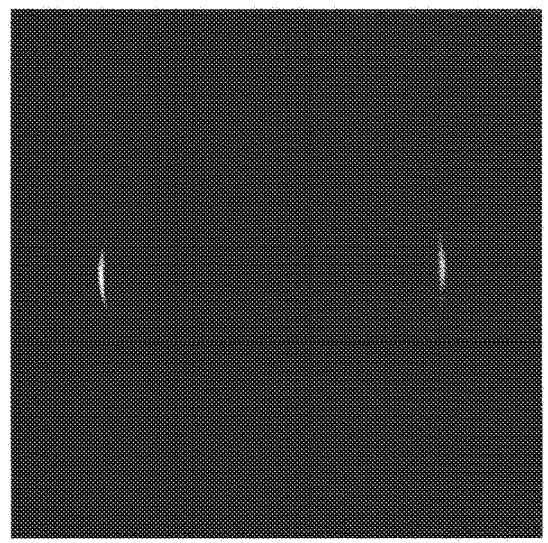
FIG. 8A is a transmission X-ray diffraction pattern of a sound-permeable membrane as sample 8.
Figure 8B:
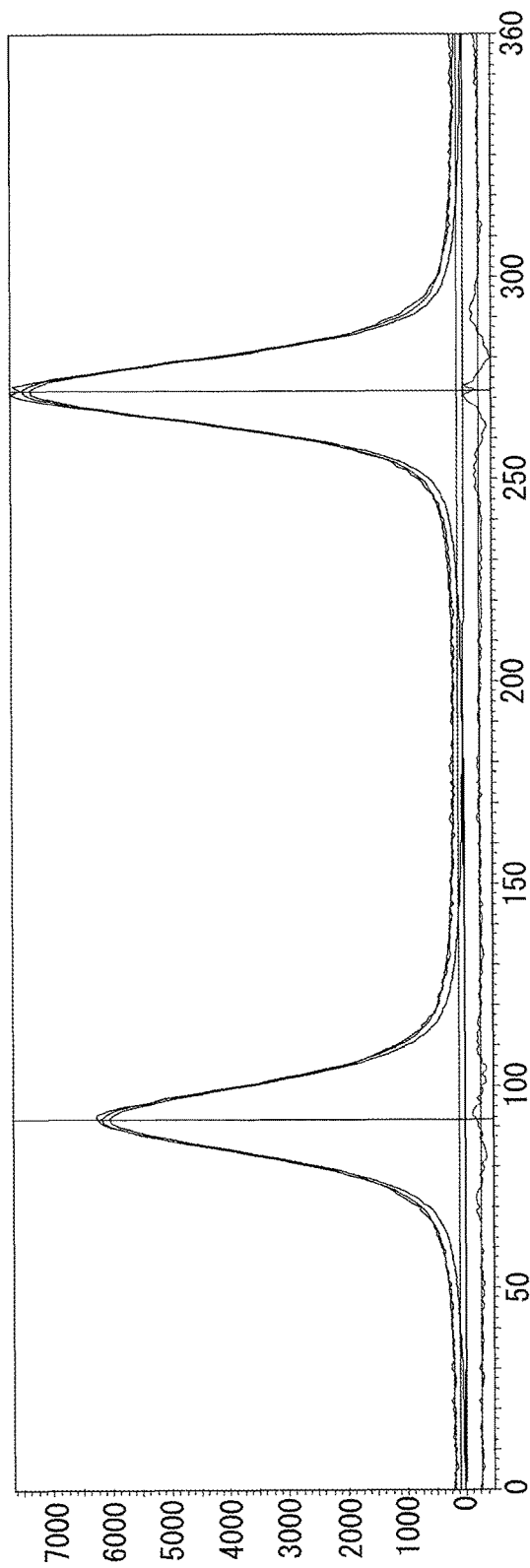
FIG. 8B is a circumferential intensity profile of the diffraction pattern of the sound-permeable membrane as sample 8.

FIG. 7A and FIG. 8A are transmission X-ray diffraction patterns of sample 3 (microporous membrane) and sample 8 (non-porous membrane), respectively. FIG. 7B and FIG. 8B are circumferential intensity profiles of the diffraction patterns of sample 3 (microporous membrane) and sample 8 (non-porous membrane), respectively. In FIG. 7B and FIG. 8B, the ordinate represents the diffraction intensity (in units of cps), while the abscissa represents the angle (angle on the ring; in units of degrees). The direction of a straight line extending between the 0° position and the 180° position corresponds to the MD direction of the measurement sample. As shown in FIG. 7A and FIG. 7B, the diffraction pattern of sample 3 (FIG. 7A) was bright at the 90° and 270° positions. Furthermore, the diffraction pattern of sample 3 had peaks also at the 0° and 180° positions, as seen from isolated peaks shown in FIG. 7B. This leads to the conclusion that the sound-permeable membrane as sample 3 was oriented both in the MD direction and in the TD direction. By contrast, the diffraction pattern of sample 8 (FIG. 8A) was bright only at the 90° and 270° positions. As seen from FIG. 8B, the diffraction pattern of sample 8 had peaks only at the 90° and 270° positions. This leads to the conclusion that the sound-permeable membrane as sample 8 was strongly oriented only in the 0° direction and 180° direction (MD direction) orthogonal to the 90° direction and 270° direction. The degree of orientation in the MD direction was calculated to be 79% for sample 3 and 89% for sample 8. It should be noted that a membrane whose molecular chain is not oriented in any particular direction (non-oriented film) shows no clear diffraction peak.

The present invention may be embodied in other forms without departing from the spirit or essential characteristics thereof. The embodiments disclosed in this specification are to be considered in all respects as illustrative and not limiting. The scope of the present invention is indicated by the appended claims rather than by the foregoing description, and all changes which come within the meaning and range of equivalency of the claims are intended to be embraced therein.

INDUSTRIAL APPLICABILITY

The technique of the present invention is applicable to various electronic devices such as mobile phones, smartphones, laptop computers, electronic notebooks, digital cameras, game consoles, portable audio devices, and wearable terminals.

What is claimed is:

1. A waterproof sound-permeable membrane adapted to permit passage of sound and prevent ingress of water, wherein
    an air permeability of the waterproof sound-permeable membrane, as expressed by Gurley number, is 20 seconds/100 mL or more,
    a water entry pressure of the waterproof sound-permeable membrane is 500 kPa or more,
    when a tensile strength at break of the waterproof sound-permeable membrane in a MD direction is denoted by T1 and a tensile strength at break of the waterproof sound-permeable membrane in a TD direction orthogonal to the MD direction is denoted by T2, a strength ratio (T1/T2) is in a range of 0.5 to 2.0, and
    the waterproof sound-permeable membrane is endurable against a continuous water pressure loading test in which the membrane is continuously exposed to a water pressure of 500 kPa for 10 minutes.

2. The waterproof sound-permeable membrane according to claim 1, wherein
    the waterproof sound-permeable membrane is formed of polytetrafluoroethylene.

3. The waterproof sound-permeable membrane according to claim 2, wherein
    the waterproof sound-permeable membrane is oriented both in the MD direction and in the TD direction.

4. The waterproof sound-permeable membrane according to claim 1, wherein
    the strength ratio (T1/T2) is in a range of 0.5 to 1.25.

5. The waterproof sound-permeable membrane according to claim 1, wherein
    at least one selected from the tensile strength T1 and the tensile strength T2 is 30 MPa or more.

6. The waterproof sound-permeable membrane according to claim 1, wherein
    the air permeability of the waterproof sound-permeable membrane, as expressed by Gurley number, is 10000 seconds/100 mL or more.

7. The waterproof sound-permeable membrane according to claim 1, wherein
    the air permeability of the waterproof sound-permeable membrane, as expressed by Gurley number, is 20 to 300 seconds/100 mL.

8. The waterproof sound-permeable membrane according to claim 1, wherein
    an insertion loss at 1 kHz measured for the waterproof sound-permeable membrane is 13 dB or less when the waterproof sound-permeable membrane has a circular sound-permeable region with a diameter of 1.5 mm.

9. The waterproof sound-permeable membrane according to claim 1, wherein
    the waterproof sound-permeable membrane has a surface density of 1 to 30 g/m$^2$.

10. The waterproof sound-permeable membrane according to claim 1, wherein
    the waterproof sound-permeable membrane has a surface density of 1 to 25 g/m$^2$.

11. The waterproof sound-permeable membrane according to claim 1, wherein
    the waterproof sound-permeable membrane is subjected to a coloring treatment.

12. A waterproof sound-permeable member comprising:
    the waterproof sound-permeable membrane according to claim 1; and
    a bonding layer placed on a surface of the waterproof sound-permeable membrane.

13. An electronic device comprising:
    a sound transducing part that performs conversion between an electrical signal and sound;
    a housing enclosing the sound transducing part and having an opening located between the sound transducing part and the outside of the housing; and
    the waterproof sound-permeable membrane according to claim 1, the waterproof sound-permeable membrane being attached to the housing to cover the opening.

14. An electronic device comprising:
    a sound transducing part that performs conversion between an electrical signal and sound;
    a housing enclosing the sound transducing part and having an opening located between the sound transducing part and the outside of the housing; and
    the waterproof sound-permeable member according to claim 12, the waterproof sound-permeable member being attached to the housing to cover the opening.

15. The waterproof sound-permeable membrane according to claim 1, wherein
    an amount of change in an insertion loss at 1 kHz of the waterproof sound-permeable membrane during the continuous water pressure loading test is 5.2 dB or less, the insertion loss being a value when the water sound-permeable membrane has a circular sound-permeable region with a diameter of 1.5 mm.

16. The waterproof sound-permeable membrane according to claim 1, wherein
    the strength ratio (T1/T2) is in a range of 0.9 to 2.0.

17. The waterproof sound-permeable membrane according to claim 1, wherein
    the strength ratio (T1/T2) is in a range of 0.9 to 1.92.

18. The waterproof sound-permeable membrane according to claim 1, wherein
    the air permeability of the waterproof sound-permeable membrane, as expressed by Gurley number, is 68 to 300 seconds/100 mL.

19. The waterproof sound-permeable membrane according to claim 1, wherein the water entry pressure of the waterproof sound-permeable membrane is 747 kPa or more, and the thickness of the waterproof sound-permeable membrane is 1 μm to 13 μm.

20. The waterproof sound-permeable membrane according to claim 1, wherein
   the waterproof sound-permeable membrane is subjected to a surface modification treatment for improving a bond strength.

* * * * *